Figure 1:
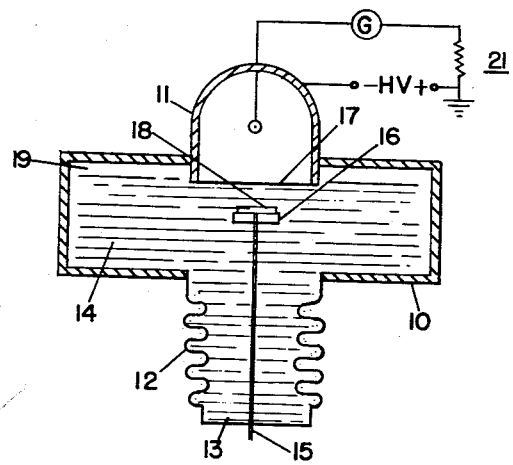

April 19, 1960     H. FRIEDMAN     2,933,607
RADIATION DISPLACEMENT GAUGE WITH REMOTE INDICATION
Filed Dec. 16, 1954

INVENTOR.
HERBERT FRIEDMAN

United States Patent Office 2,933,607
Patented Apr. 19, 1960

2,933,607

RADIATION DISPLACEMENT GAUGE WITH REMOTE INDICATION

Herbert Friedman, Arlington, Va., assignor, by mesne assignments, to J. J. Maguire, trading as J. J. Maguire Company, Washington, D.C.

Application December 16, 1954, Serial No. 475,766

8 Claims. (Cl. 250—83.3)

This invention relates to radiation type displacement gauges which provide high sensitivity and are adapted to a wide field of application.

Radiation displacement gauges are known in which the motion varies the length of an ionized path and thus produce a response in accordance with the variation of the ionization current in the path. The present invention provides radiation displacement gauges in which known transmission characteristics of mediums for particular types of radiation are utilized with a relatively moving detector and radioactive source to obtain indication of the change of spacing therebetween.

It is known that alpha particles have an energy loss in air of approximately one mev. (million electron volts) per centimeter and a loss in most solid or liquid materials of one mev. per milligram per centimeter square (mg./cm.$^2$). Since the energy of alpha particles in most available sources such as, for example, radium, polonium and plutonium is of the order of several mev., the range of these rays in air is only a few centimeters square. A similar situation obtains, although the order of magnitudes are different, for beta rays where ranges are of the order of 100 milligrams per centimeter square per mev. of beta ray energy. A soft beta ray emitter such as C$^{14}$ (carbon 14) has a spectrum of maximum energy about 150,000 ev. which will have a range of several milligrams per centimeter square. Strontium 90 with a maximum energy of about 2 mev. will have a range of the order of 200 milligrams per centimeter square.

Figure 2:
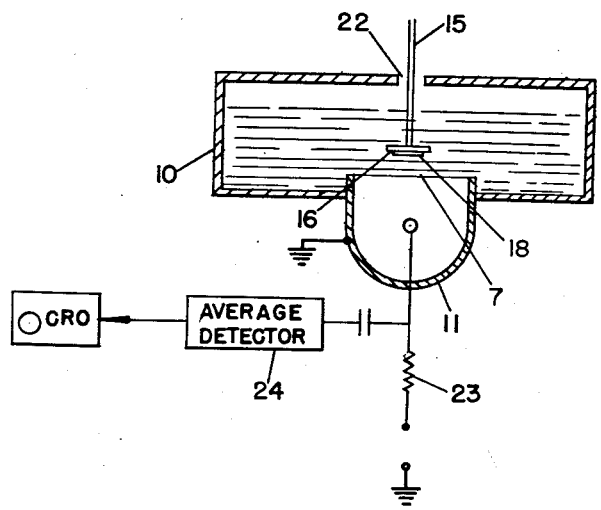

It is an object of the present invention to provide improved radiation type displacement and vibration sensing apparatus in accordance with the foregoing principles. This and other objects will become apparent from the following description of exemplary preferred embodiments in conjunction with the drawing in which:

Fig. 1 is a sectional view of a displacement sensing arrangement and an associated circuit; and Fig. 2 is a view of a modified sensing device and detector.

The displacement gauge of Fig. 1 has a casing 10 which is connected with fluid tight seals to an ionization-type detector tube 11 and an extensible bellows 12 which has at the remote end an end seal 13. The structure formed by joining the members 10, 11, 12 and 13 provides a fluid tight enclosure which is substantially filled with a coupling liquid 14 which may preferably have low viscosity and low surface tension. The enclosure 10–13 may be filled with the liquid 14 by any suitable means such as a closable vent, in the casing 10, not shown.

Passing through the end seal 13 is sealed relation is a rod 15 which terminates in a disc or plate 16 disposed in predetermined spaced relation to an energy permeable window 17 of the tube 11. The plate 16 has a coating 18 of radioactive material opposed to the window 17. Suitable sources of alpha and beta radiations have been set forth herein and these may be applied in any desired manner. Radium foils for alpha ray sources may be protected with thin flashings of nickel or gold. Polonium and plutonium may be electroplated on metallic surfaces which could be used for the plate 16. Sources also may be prepared in the form of paints and applied in the manner applied to luminous watch dials. The displacement which is to be sensed is applied axially to the rod 15 causing a compression or extension of the bellows 12 and varying the length of the path through the medium 14 from the source 18 to the window 17. To prevent undue pressures a small air space 19 may be provided above the liquid 14.

The detector tube 11 may be of any well known type such as a proportional counter, scintillation counter, ion chamber, or Geiger counter. A simple circuit generally designated 21 is shown for energizing a two electrode tube 11 and sensing the response thereof to radiation received through the window 17 from the source 18. With this arrangement linear displacements or vibrations up to a limiting frequency determined by the viscosity and inertia of the coupling liquid 14 can be measured. For example, if the liquid 14 has a density of unity, a displacement of 0.0001 cm. would change the path length in the medium 14 by 1 mg./cm.$^2$. Using the detector 11 as a proportional counter this displacement can be made to produce a change in ionization current from zero to 10 microamperes. With well known electronic microammeters and a strong alpha source, the ionization current can be measured to hundredths of a microampere for which the equivalent displacements would be millionths of an inch.

In Fig. 2 a modified arrangement is shown in which the casing 10 containing the tube 11 is inverted and the rod 15 enters the casing 10 through an opening 22. An open container for the coupling liquid 14 can be used whenever the apparatus will be maintained in substantially upright position. The operation of the device of Fig. 2 is the same as that of Fig. 1 with the ionization of the tube 11 due to incident energy producing voltage impulses across a resistor 23. For studying the form of vibrations and other time varying displacements the magnitude of the voltage across the resistor 23 can be detected by a detector circuit 24 and displayed as a function of any other variable, such as the time, on a cathode-ray oscilloscope 25 or other indicator. Where transient displacements or periodic displacements are to be observed faithful response well up into the audio and supersonic frequency ranges can be obtained depending upon the dynamic mechanical characteristics of the system. For the higher frequency ranges the mass of the driven portion can be designed extremely small since it is required to carry only the comparatively weightless radioactive source 18.

The present invention is capable of a wide variety of applications and modifications may be made without departing from the scope of the appended claims.

I claim:

1. Displacement sensing apparatus comprising a container defining an interior volume for retaining a liquid medium absorptive of radioactive radiation, a detector for said radiation associated with said container and having a portion for receiving said radiation positioned within said volume to be normally immersed in said medium, a radioactive source positioned in said medium opposed to said radiation receiving portion, means for relatively moving said source and said receiving portion to vary the spacing therebetween, and means responsive to the output of said detector in accordance with variations in said spacing.

2. Apparatus according to claim 1 in which said source is an alpha ray source and said detector is an alpha ray detector.

3. Apparatus according to claim 1 in which said medium is a low viscosity fluid retained by said container and filling the space between said source and said energy receiving portion of said detector.

4. Apparatus according to claim 3 in which said responsive means includes an oscillograph responsive to the energy level of said radiation incident upon said detector.

5. Displacement sensing apparatus comprising a container defining an interior volume for retaining a liquid medium absorptive of radioactive radiation, flexible means sealed in a wall of said container, a surface supported normally immersed in said medium within said chamber by said flexible means and movable with respect to said chamber upon extension of said flexible means, a source of radioactive radiation on said surface, a detector for said radiation having a portion for receiving said radiation positioned within said volume to be normally immersed in said medium opposed to said source, means for relatively moving said source and said receiving portion through extension of said flexible means to vary the spacing therebetween, and means responsive to the output of said detector in accordance with variations in said spacing, said container, flexible means and detector forming a closed chamber with said medium confined therein.

6. Apparatus according to claim 5 in which said medium is a low viscosity fluid retained by said container and filling the space between said source and said energy receiving portion of said detector.

7. Apparatus according to claim 6 in which said source is an alpha ray source.

8. Displacement sensing apparatus comprising radioactive radiation source means, detector means for said radiation, a support for said source means and said detector means to position the two means in spaced opposed relation for the passage of radiation from said source means to said detector means through a radiation path, means for retaining a liquid medium in said radiation path and in contact with at least one of said means and means for moving said one means in accordance with said displacement to change the length through said medium of said radiation path whereby the energy detected by said detector means is related to said displacement by a factor including the absorption of said medium.

References Cited in the file of this patent

UNITED STATES PATENTS

| | | |
|---|---|---|
| 2,501,560 | Blau | Mar. 21, 1950 |
| 2,551,614 | Litton | May 8, 1951 |
| 2,552,050 | Linder | May 8, 1951 |
| 2,595,550 | Simpson | May 6, 1952 |
| 2,602,906 | Johnson | July 8, 1952 |
| 2,662,985 | Good | Dec. 15, 1953 |
| 2,676,265 | Green | Apr. 20, 1954 |
| 2,745,969 | Keller | May 15, 1956 |